(12) United States Patent
Martin

(10) Patent No.: US 6,404,488 B1
(45) Date of Patent: Jun. 11, 2002

(54) PHOTOMETER

(75) Inventor: Nicolas Martin, Amay (BE)

(73) Assignee: University of Liege, Liege (BE)

(*) Notice: Subject to any disclaimer, the term of this patent is extended or adjusted under 35 U.S.C. 154(b) by 0 days.

(21) Appl. No.: 09/655,839

(22) Filed: Sep. 6, 2000

(30) Foreign Application Priority Data

Sep. 6, 1999 (EP) ............................................. 99202923

(51) Int. Cl.⁷ ................................................. G01J 1/42
(52) U.S. Cl. ...................................................... 356/218
(58) Field of Search ............................... 356/218, 226; 250/214, 206

(56) References Cited

U.S. PATENT DOCUMENTS

| | | | |
|---|---|---|---|
| 3,790,288 A | 2/1974 | Hostetter | 356/226 |
| 5,087,808 A | 2/1992 | Reed | 250/214 R |
| 5,473,461 A | 12/1995 | Miremadi | 359/189 |

FOREIGN PATENT DOCUMENTS

| | | |
|---|---|---|
| DE | 39 16 184 | 11/1989 |
| DE | 41 14 489 | 11/1992 |
| DE | 41 14 592 | 11/1992 |
| DE | 42 14 360 | 11/1993 |
| EP | 0 124 798 | 11/1984 |
| EP | 0 176 448 | 4/1986 |
| EP | 0 384 298 | 8/1990 |
| EP | 0 656 685 | 6/1995 |
| FR | 2 658 605 | 8/1991 |
| WO | WO95/21371 | 8/1995 |
| WO | WO99/00649 | 1/1999 |

*Primary Examiner*—Frank G. Font
*Assistant Examiner*—Michael P. Stafira
(74) *Attorney, Agent, or Firm*—Jacobson Holman, PLLC

(57) ABSTRACT

Photometer comprising a photo diode, arranged for producing an electric current, proportional to the intensity of picked-up light, the photo diode being linked by the intermediate of a resistance to an operational amplifier equipped with a bandpass filter, the value of the resistance is sized in such way as to level the resonance peak in the pass-band of the filter.

4 Claims, 4 Drawing Sheets

PHOTOMETER

Figure 1:
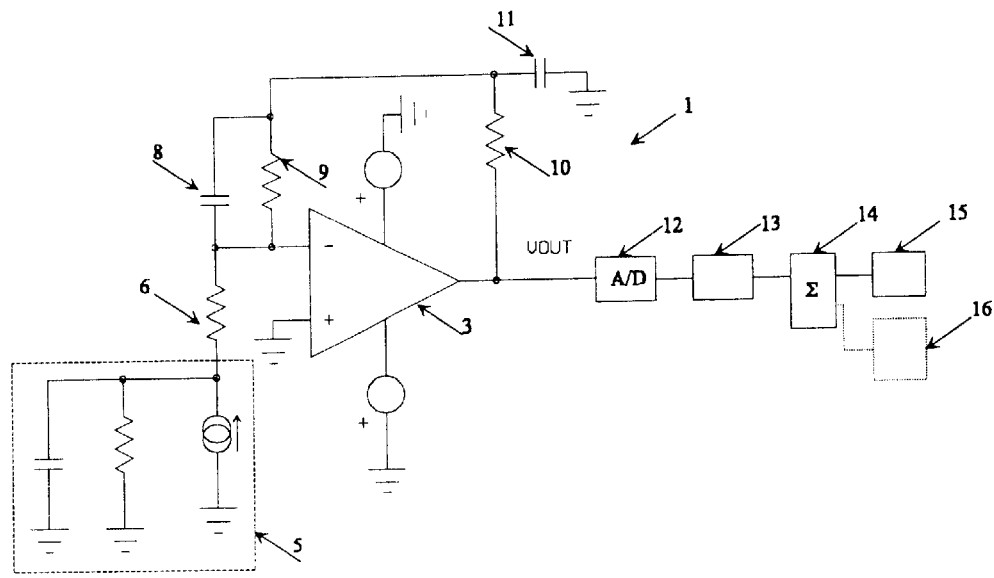

This invention concerns a photometer comprising a photo diode, arranged to produce an electric current proportional to the intensity of light picked up, the photo diode being linked by the intermediate of a resistance to an operational amplifier equipped with a band-pass filter.

Such a photometer is known from U.S. Pat. No. 3,790,288. The photometer is used for determining the intensity of the emitted light by an incident light source. For this purpose it includes a photo diode, generally of silicium, which converts the incident light into electric current. An operational amplifier allows supplying to its exit a tension that indicates the intensity of the light picked up. In the known device, the resistance connected between the photo diode and an entry of the operational amplifier, and another resistance, both present in the regulation loop of the amplifier, together determine the amplification factor of the loop.

A disadvantage of the known photometer is that the measuring precision is too limited for certain applications where a precision of 0.01% in the variation of intensity of the light is required.

The invention has the purpose to realize a photometer allowing to obtain a precision of 0.01% or less.

For this purpose a photometer according to the invention is characterized in that the value of the resistance is sized in such a way as to level the peak of resonance in the pass-band of the filter. The invention is based on the constatation that the peak of resonance, present in the pass-band of the filter, which forms the regulation loop of the amplifier, sensibly limits the precision of the photometer, because it prevents all measurements in a frequency band around this peak of resonance. Sizing the resistance between the photo diode and the amplifier in such a way as to level the peak, opens this frequency band to a precise measurement of the intensity of light, because the gain of the amplifier is now practically constant in the whole pass-band.

It is necessary to point out that, even if the use of a resistance at the entry of an operational amplifier is known in itself, and in particular in disclosed prior art, as a component, allowing to determine the factor of amplification of the loop, nothing in the prior art allows the use of this resistance as an electronic component, allowing to absorb the energy of the resonance peak in the pass-band.

A first preferential embodiment of a photometer according to the invention is characterized in that for a resonance peak of about 2.5 KHZ, the value of the resistance is situated between 1 MΩ and 1.6 MΩ. This allows to maintain the gain of the amplifier sensibly constant in the most usual pass-band for a photometer.

A second preferential embodiment of a photometer according to the invention is characterized in that the amplifier includes an exit, arranged for providing there a proportional electric tension signal to said electric current, said exit being linked to an analog-digital converter, the latter linked to a sampling unit, arranged for sampling said tension signal and furnishing a set of samples. This allows digital computer treatment of the signal.

Preferably, the unit of sampler is linked to an accumulator, arranged for accumulating a predetermined number of samples and for determining their average. This allows to reduce the electric noise.

The invention will now be described more in detail with the help of the drawings which illustrate a preferential embodiment of the invention. In the drawings:

FIG. 1 schematically shows the electronic circuit of a photometer according to the invention.

Figure 6:
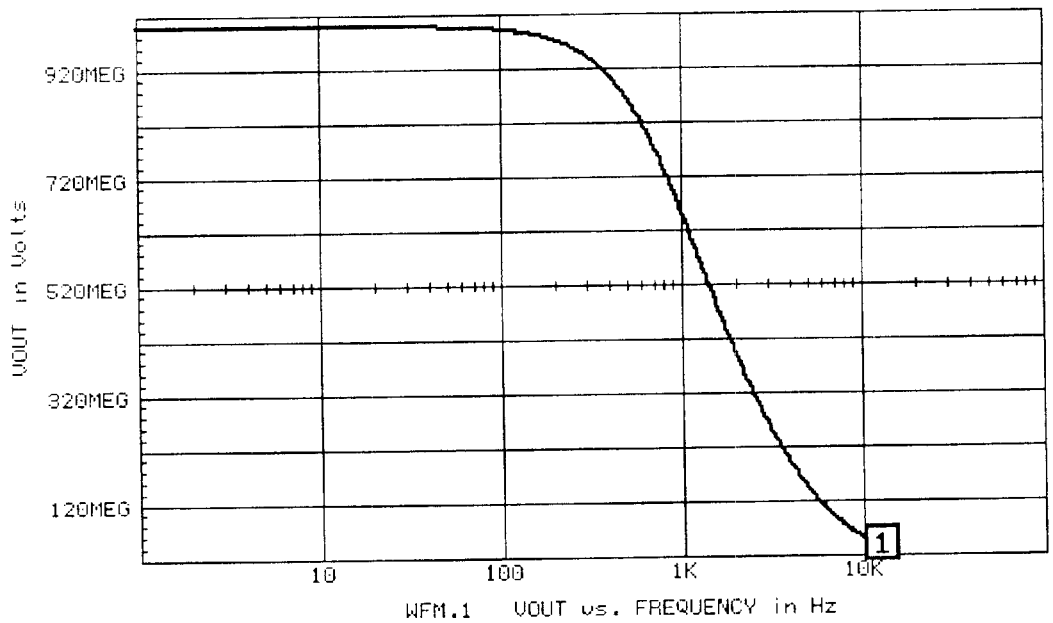
Figure 7:
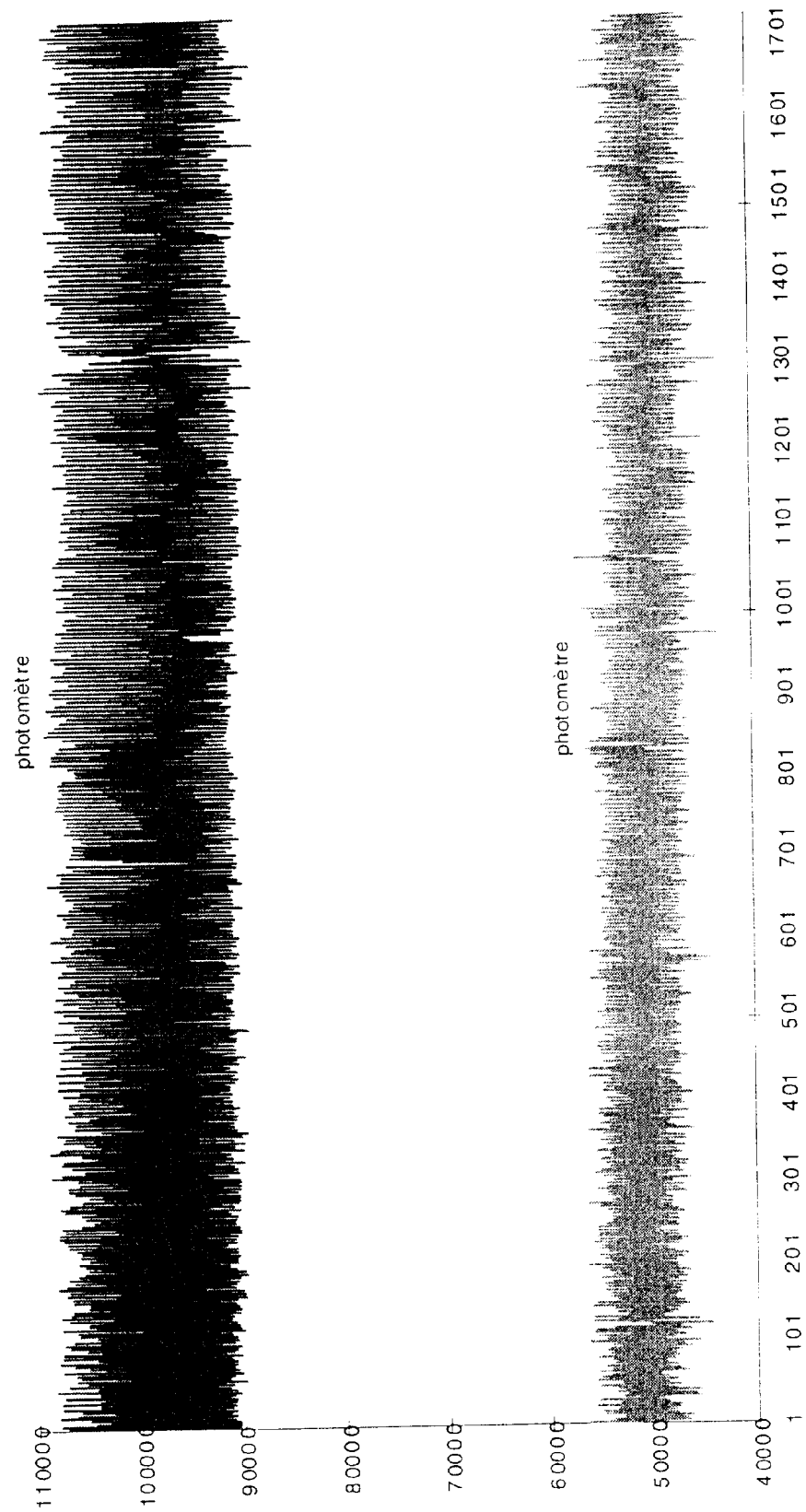

FIGS. 2 to 6 show graphics illustrating the tension at the exit of the amplifier according to the frequency for resistances of 10 KΩ, 1 MΩ, 1.2 MΩ, 1.55 MΩ and 3.3 MΩ respectively, and FIG. 7 shows the signal difference between a classic photometer and a photometer according to the invention.

In the drawings, the same reference has been attributed to the same or similar elements.

The photometer 1 according to the invention and whose preferential embodiment is shown in FIG. 1 includes a first entry, for example the inverting entry of an operational amplifier 3 of the electrometer type connected to a photo diode 5 and represented by its equivalent scheme formed by a parallel connection comprising a capacitor, a resistance and a current source symbolizing the active part of the photo diode. The photo diode is linked in series with a resistance 6.

The photo diode preferably includes a thermistor which measures the temperature of the silicium layer which forms the sensible layer of the photo diode. The thermistor is linked to a cell using Peltier effect, allowing the thermic treatment of the photo diode.

The regulation loop of the differential amplifier includes a parallel branch of a capacitor 8 and of a resistance 9, linked to the branching point of a resistance 10 and of a capacitor 11. The capacitor 8 and the resistance form a low-pass filter of the amplifier 3 allowing to reduce the noise. One exit of the differential amplifier 3 is linked to an analog-digital converter 12, whose exit is linked to a sampling unit 13. This sampling unit is arranged for sampling the digital data of the digital tension signal, furnished by the converter 12. One exit of the sampling unit 13 is linked to a accumulator 14, arranged for accumulating a predetermined number of samples and for determining their average. The accumulator for its part is linked either to a data processing unit 15 or to a transmission unit 16, allowing the transmission of data.

Figure 2:
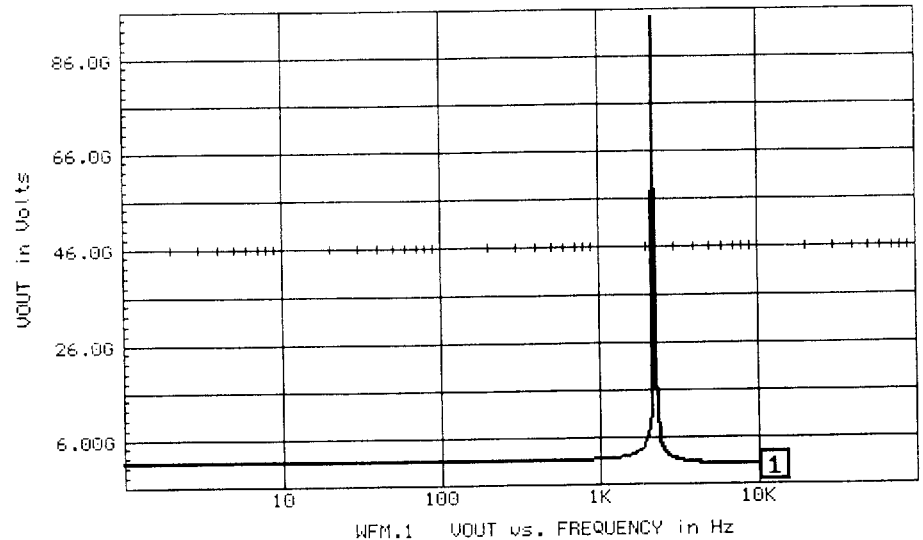
Figure 3:
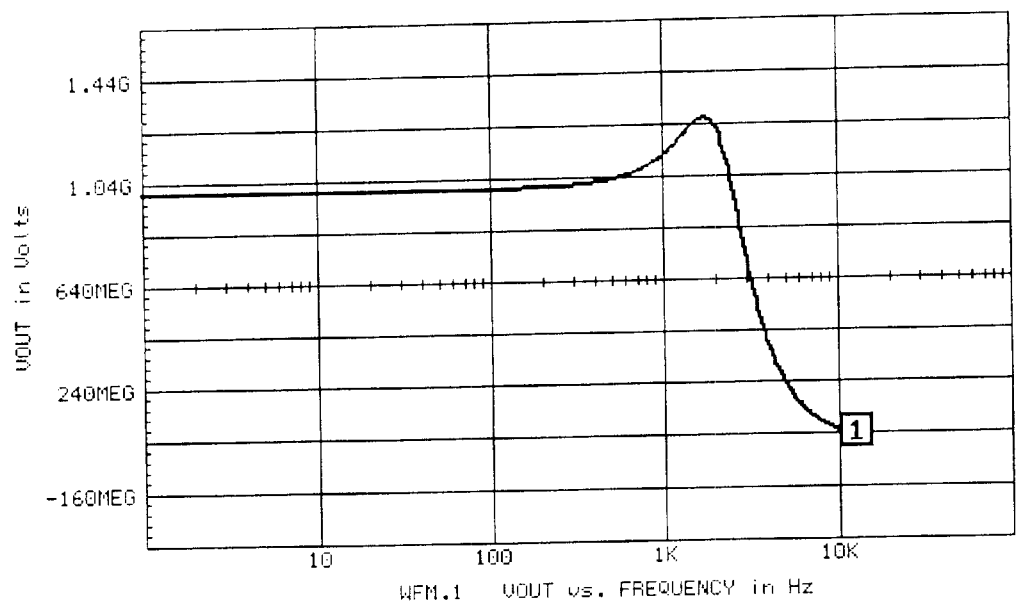
Figure 4:
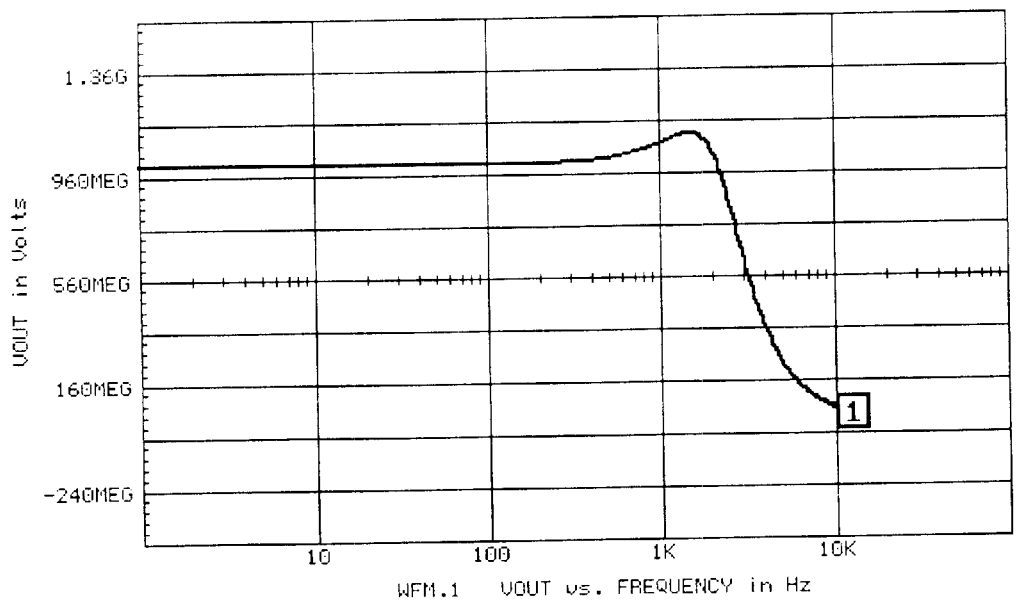
Figure 5:
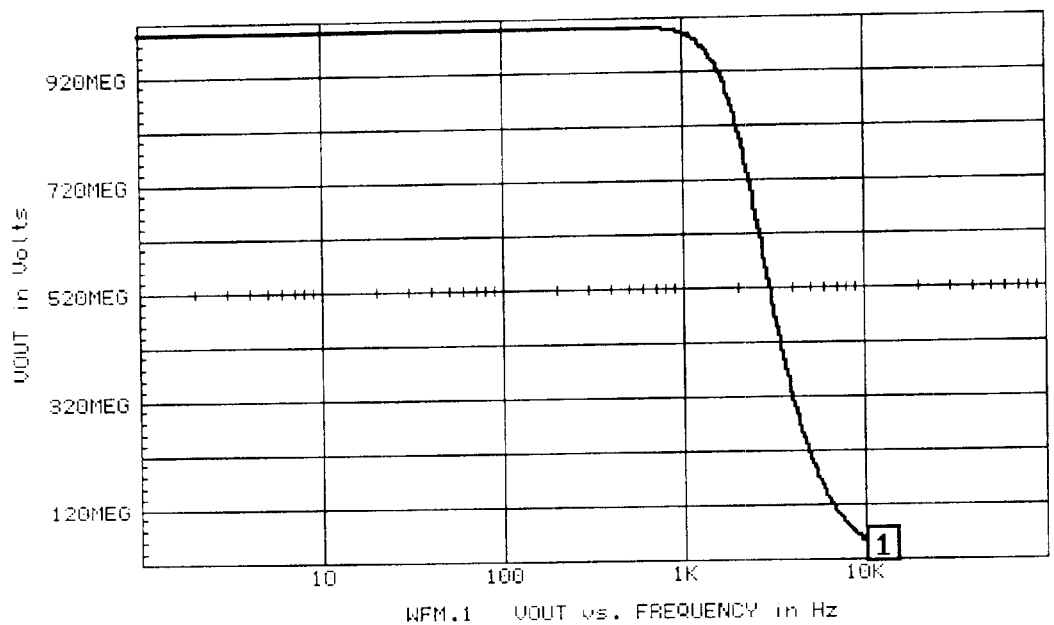

The light picked up by the photo diode 5 is converted by the latter into an electric current proportional to the intensity of light picked up. Without a particular measurement, the amplifier cannot have a constant gain in the whole pass-band. As FIG. 2 shows, which illustrates the tension $V_{out}$ on the line 16 at the exit of the amplifier 3 according to the frequency, a resonance peak is observed at a frequency of about 1.3 KHZ in the pass-band. This resonance peak has been measured with a photometer where the resistance 6 has a value of 10 KΩ.

Surprisingly, it has now been established, that by sizing the value of the resistance 6 to a suitable value, it was possible to level the present resonance peak in the pass-band. In fact, by increasing the value of this resistance, it is possible to absorb the energy furnished by the photo diode and thus to level the resonance peak. As disclosed in FIG. 3, where the resistance 6 includes a value of 1 MΩ, the intensity of the resonance peak has already considerably diminished in the pass-band. Only a feeble resonance peak remains around 1.25 KHZ. By augmenting the value of the resistance 6 to 1.2 MΩ, as disclosed in FIG. 4, more energy is absorbed, and with a value of 1.55 MΩ for resistance 6, all the energy is absorbed and the gain is sensibly constant in the pass-band. It is necessary to point out that the measures have been carried out at ambient temperature. The gain is situated in 1 and $10^9$. However it should be pointed out that at higher values, the electric noise produced by electronic components of the photometer is no longer negligible.

Increasing the value of the resistance to values higher than 1.6 MΩ is not advisable because at higher values, the gain does not remain constant anymore. Thus, as shown in FIG. 6, where a value of 3.3 MΩ was used, one ascertains a decrease of the tension already at a frequency of 250 HZ.

The digital/analogic converter 12 preferably operates at 20 bits because in general the intensity of the light picked up does not vary quickly in time. This succession of 20 bits words is supplied to the sampler 13, which transmits these words to the accumulator 14. In fact, the photometer produces two sources of noise, the electric noise and the photonic noise. The electric noise is Gaussian and zero on an average. To reduce its effect, it is enough then to make the average on the values of tensions supplied by the amplifier. The accumulator 14 now allows to accumulate a predetermined number, for example 160, of samples and to determine the average. This allows to increase the signal-noise relation, as well as the dynamics of the range of measuring, that is to say the distance between the complete range and the smallest value to be measured. The precision is thus augmented and a value of $5.10^{-3}\%$ of precision can be reached for a sampling frequency of 4 KHZ.

The FIG. 7 shows that a photometer according to the invention has a decidedly lower noise than a classical photometer B.

What is claimed is:

1. Photometer comprising a photo diode, arranged for producing an electric current, proportional to the intensity of picked-up light, the photo diode being linked by the intermediate of a resistance to an operational amplifier equipped with a band-pass filter, characterized in that the value of the resistance is sized in such way as to level the resonance peak in the pass-band of the filter.

2. Photometer according to claim 1, characterized in that for a resonance peak of about 2.5 KHZ, the value of the resistance is situated between 1 MΩ and 1.6 MΩ.

3. Photometer according to claim 1, characterized in that the amplifier includes an exit arranged for supplying there an electric tension signal, proportional to said electric current, said exit being linked to an analog-digital converter linked to a sampling unit, arranged for sampling said tension signal and supplying a set of samples.

4. Photometer according to claim 3, characterized in that the sampling unit is linked to an accumulator, arranged for accumulating a predetermined number of samples and for determining their average.

* * * * *